Figure 1:
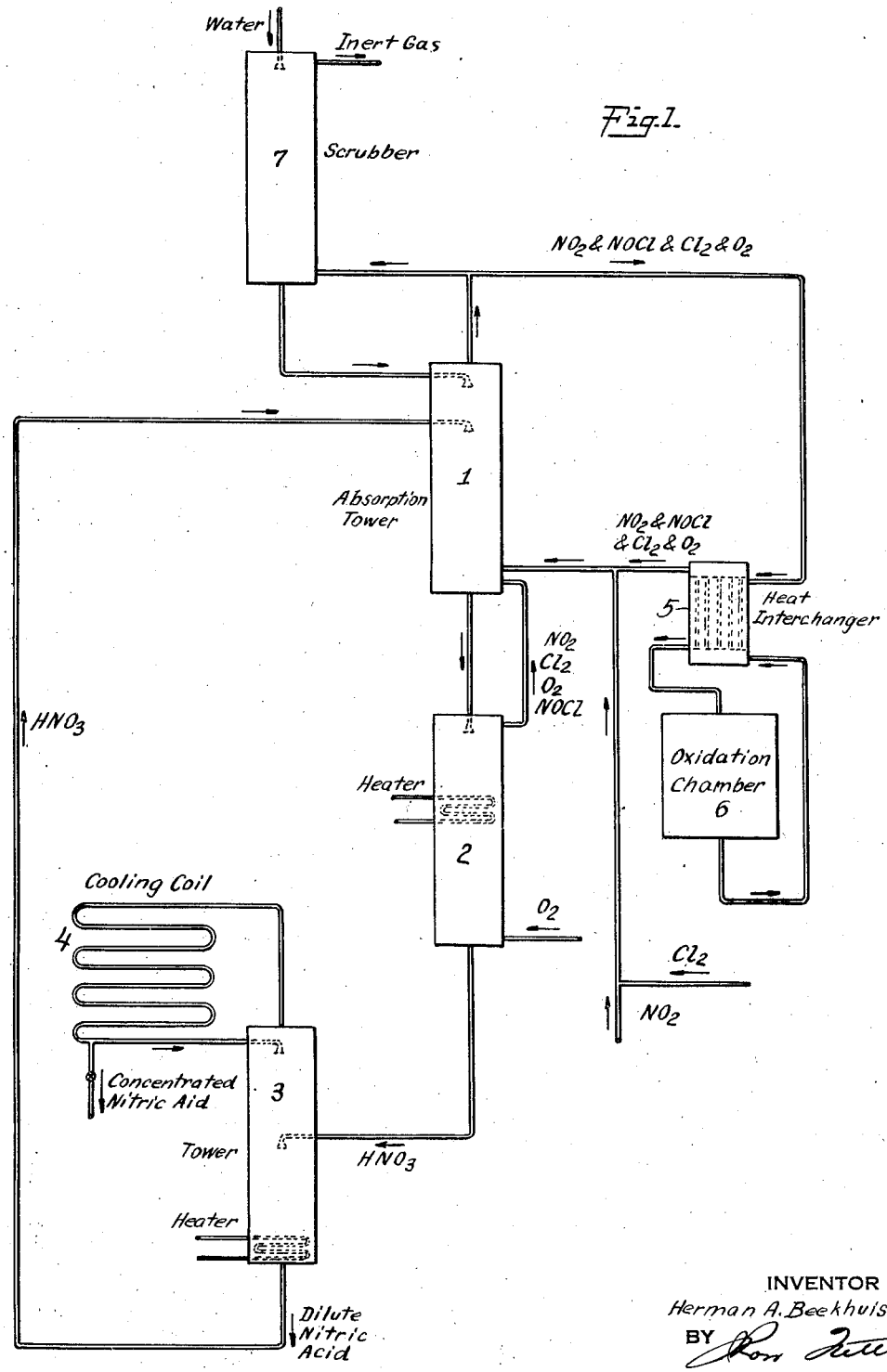

Jan. 2, 1940.   H. A. BEEKHUIS, JR   2,185,579
PROCESS FOR THE PRODUCTION OF NITRIC ACID
Original Filed Nov. 9, 1933   3 Sheets-Sheet 1

INVENTOR
Herman A. Beekhuis Jr.
BY
ATTORNEY

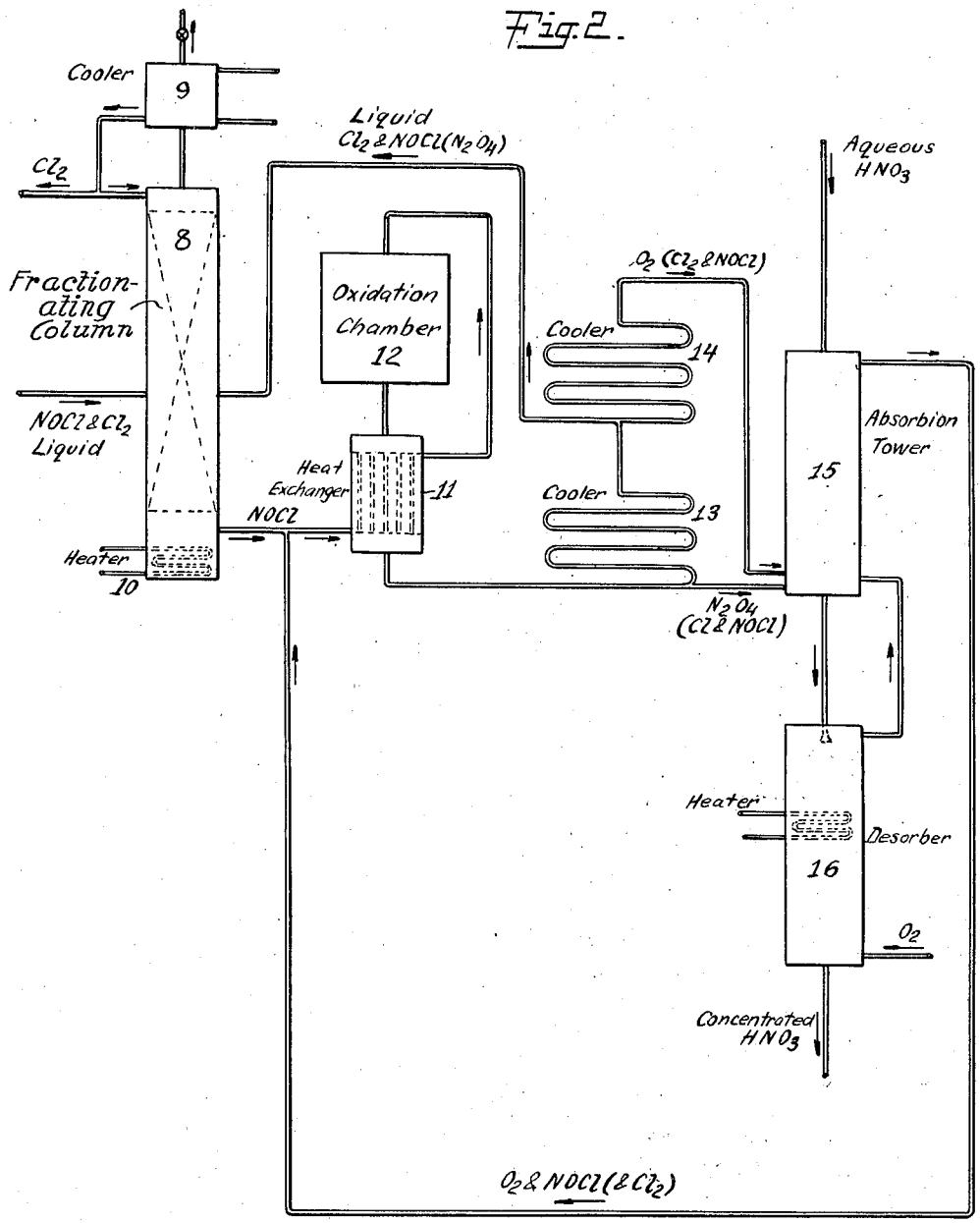

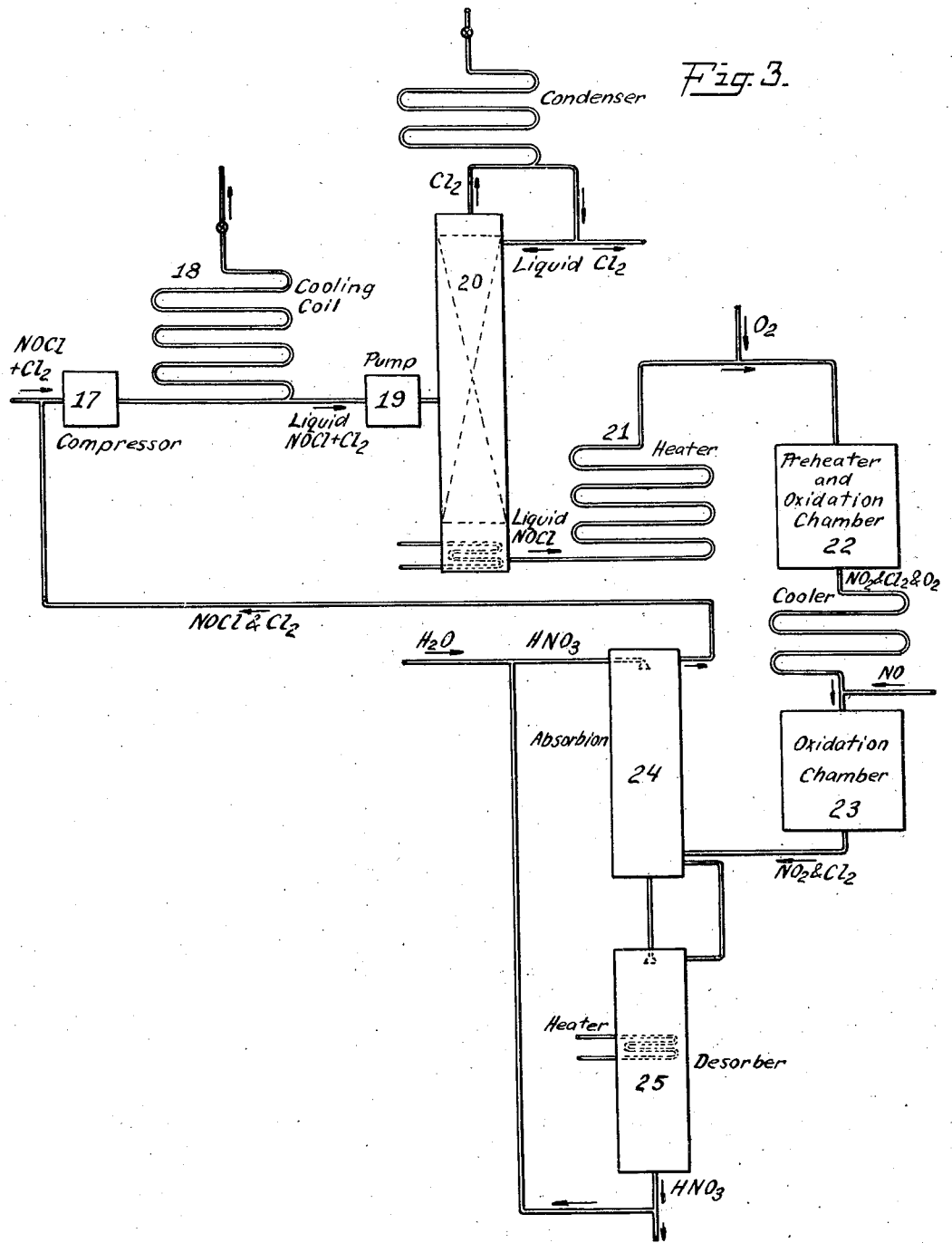

Patented Jan. 2, 1940

UNITED STATES PATENT OFFICE 2,185,579

PROCESS FOR THE PRODUCTION OF NITRIC ACID

Herman A. Beekhuis, Jr., Petersburg, Va., assignor, by mesne assignments, to The Solvay Process Company, New York, N. Y., a corporation of New York Application November 9, 1933, Serial No. 697,240
Renewed October 27, 1938

12 Claims. (Cl. 23—162)

This invention relates to a process for the production of nitric acid from nitrogen peroxide and particularly to a process for the production of a relatively concentrated nitric acid by absorption of nitrogen oxides in water or in a dilute nitric acid.

Numerous processes have heretofore been proposed for the absorption of nitrogen oxides, particularly nitrogen peroxide ($NO_2$) in water to form nitric acid. The reaction taking place may be expressed by the equation:

I $\qquad 3NO_2 + H_2O = NO + 2HNO_3$ or when oxygen is present in the nitrogen peroxide gas this oxygen serves to re-oxidize nitric oxide (NO) to nitrogen peroxide which may then react with the water to form nitric acid. The reaction may then be expressed by the equation:

II $\qquad 2NO_2 + H_2O + 0.5O_2 = 2HNO_3$

While nitrogen peroxide reacts readily with water to form a dilute aqueous nitric acid, the above reaction is an equilibrium reaction; that is to say, nitric acid and nitric oxide tend to react to form water and nitrogen peroxide. For a given concentration of nitrogen peroxide and of aqueous nitric acid in contact with each other there is a definite partial pressure of nitric oxide. A decrease in the concentration of nitrogen peroxide or an increase in the concentration of the nitric acid favor the reaction of the nitric acid and nitric oxide to form water and nitrogen peroxide. Thus, for any given concentration of nitrogen peroxide in the gas contacted with water or dilute nitric acid there is a definite limitation to the concentration of nitric acid which may be formed due to the increasing concentration of the nitric oxide formed by the reaction of nitrogen peroxide and water. With oxygen present the reaction of the nitric oxide to form nitrogen peroxide is moderately rapid so long as the concentration of the nitric oxide corresponds to about 0.1 to 1 atmosphere partial pressure of NO. For low concentrations of nitric oxide, for example with nitric oxide partial pressures below about 0.01 atmosphere, its reaction with oxygen is slow. Although no special difficulty is involved in obtaining nitric acid up to 60% to 70% strength from nitrogen peroxide and oxygen, since this involves partial pressures of NO in equilibrium with the nitric acid of above about 0.01 atmosphere, when it is attempted to produce directly an acid of greater strength, special means must be used to increase the otherwise very low rate of reaction between the nitric oxide and oxygen due to the low nitric oxide concentration in equilibrium with the relatively highly concentrated nitric acid.

It is an object, therefore, of this invention to provide a process whereby the reaction of nitrogen peroxide with water to form nitric acid may be promoted and the reverse reaction of nitric acid with nitric oxide may be inhibited. Thus the direct production of relatively concentrated nitric acid by absorption of nitrogen peroxide in water or dilute nitric acid may be facilitated.

I have discovered that when nitrogen peroxide is absorbed in nitric acid solution in the presence of chlorine that nitrosyl chloride is formed. In the presence of relatively concentrated nitric acid solution the nitrosyl chloride is evolved from the solution substantially free from nitric oxide. This reaction may be expressed by the equation:

III $\qquad 3NO_2 + 0.5Cl_2 + H_2O = 2HNO_3 + NOCl$

That this reaction will take place and nitrosyl chloride be evolved from the concentrated nitric acid is surprising since gaseous nitric oxide and chlorine react very slowly at ordinary atmospheric temperatures at which the absorption of nitrogen peroxide to form nitric acid is carried out; in fact, they react more slowly than does nitric oxide and oxygen. Furthermore, chlorine is relatively insoluble in concentrated nitric acid solution, and thus the reaction of the chlorine with the nitric oxide formed from nitrogen peroxide and water would not be expected to take place. Despite this, however, the chlorine does in fact appear to dissolve in the concentrated nitric acid sufficiently rapidly to oxidize the nitric oxide to nitrosyl chloride and thus inhibit the reaction of the nitric oxide with the nitric acid.

As noted above, the oxidation of nitric oxide in concentrations corresponding to partial pressures of NO below about 0.01 atmosphere is so slow as to be a serious handicap in the production of concentrated nitric acid by the direct absorption of nitrogen peroxide in water or in dilute nitric acid. However, with chlorine present it is feasible to operate under conditions which correspond to a nitric oxide concentration equivalent to a partial pressure of NO of 0.0003 atmosphere or even less, and a concentrated nitric acid may readily be produced by the direct absorption of nitrogen peroxide in the presence of chlorine. The nitric acid thus obtained by absorption of nitrogen peroxide from a gas containing chlorine contains chlorine (either free or combined) which may, however, be readily stripped from the concentrated nitric acid by heating the acid, preferably while passing a gas such as oxygen in contact with the heated acid. Nitrosyl chloride and some nitrogen peroxide gas may thus be evolved from the nitric acid and a pure concentrated nitric acid obtained.

In carrying out the process of this invention for the production of nitric acid, nitrogen peroxide is treated with an aqueous liquor such as water or dilute nitric acid in the presence of chlorine and the resulting aqueous nitric acid solution which during the absorption of the nitrogen peroxide is at ordinary atmospheric temperatures may then be heated, for example, to a temperature above about 50° C., to free it of chlorine, particularly combined chlorine.

In carrying out a process for producing nitric acid by reaction of nitrogen peroxide with water, the aqueous liquor used for treating the nitrogen peroxide may originally contain nitric acid in amount corresponding to above about 40% $HNO_3$ or if a more dilute acid or water is employed in the course of absorbing and reacting the nitrogen peroxide with water, a nitric acid of this concentration (above about 40% $HNO_3$) may be formed. The process of this invention comprises the treatment of an aqueous nitric acid containing above about 40% $HNO_3$, such as the acids referred to, with nitrogen peroxide and chlorine, the chlorine being present in amount sufficient to maintain the partial pressure of nitric oxide below about 0.01 atmosphere during the reaction of the nitrogen peroxide with the nitric acid.

The process of this invention further comprises the treatment of nitrogen peroxide with both an aqueous liquor and oxygen in the presence of chlorine, the oxygen being employed in the proportions of about 0.5 mol or more of oxygen for every 2 mols of $NO_2$ and the chlorine being preferably present in the proportions of about 0.5 mol $Cl_2$ or more for every 3 mols of $NO_2$.

A preferred embodiment of the invention comprises passing a gas containing nitrogen peroxide and chlorine in contact with a dilute aqueous nitric acid containing, for example, below about 70% $HNO_3$, and preferably about 40% to 70% $HNO_3$, to form a more concentrated aqueous nitric acid, preferably one containing more than 70% $HNO_3$, by absorption of nitrogen peroxide. The chlorine is preferably employed in the proportions of about 0.5 mol or more of chlorine for every 3 mols of nitrogen peroxide. The resulting concentrated nitric acid solution may then be heated to free it of chlorine, preferably while passing oxygen in contact with the heated solution either as a concentrated oxygen gas or as air. The gases evolved in this treatment of the heated nitric acid may be introduced into the nitrogen peroxide gas passed in contact with the dilute nitric acid. The gases passing out of contact with the nitric acid, which contain nitrosyl chloride, may be treated to oxidize the nitrosyl chloride to nitrogen peroxide and chlorine, and this chlorine-containing gas returned for reaction with additional nitrogen peroxide, water and nitric acid to form concentrated nitric acid.

This invention is of particular value in the production of highly concentrated nitric acid containing, for example, 95% up to 100% $HNO_3$. As noted above aqueous nitric acid containing up to about 70% $HNO_3$ may be prepared by the absorption of nitrogen peroxide in water, but to make acids of higher strength requires special provisions to increase the rate of oxidation of the nitric oxide. Nor may the aqueous acids of 70% $HNO_3$ or below be distilled to produce a highly concentrated acid. Nitric acid ($HNO_3$) and water form a constant boiling mixture containing about 68% $HNO_3$ so that no acid of a higher concentration than 68% may be obtained by distilling a weaker acid, nor is it practicable to obtain a concentrated acid by distilling one containing but little more than 68% $HNO_3$, such as an acid containing about 70% $HNO_3$. This invention, however, comprises a process wherein a nitric acid containing above 70% $HNO_3$ is formed by reaction of nitrogen peroxide with water or a dilute aqueous nitric acid, and this relatively concentrated acid is then fractionally distilled to yield a dilute nitric acid residue and a highly concentrated nitric acid product, which may contain upwardly of 95% to 100% $HNO_3$. An embodiment of this aspect of the invention comprises reacting nitrogen peroxide with an aqueous nitric acid containing, say, 68% to 74% $HNO_3$ in the presence of chlorine until the acid contains about 80% to 90% $HNO_3$. This more concentrated acid may then be fractionally distilled to obtain a relatively dilute nitric acid as a residue and a concentrated nitric acid containing about 95% or up to 100% $HNO_3$ as a distillate.

For a further understanding of this invention reference is had to the following detailed description of processes for the production of a concentrated nitric acid from water or relatively dilute nitric acid which are illustrated in the accompanying drawings. In the drawings—

Fig. 1 shows a process for the reaction of nitrogen peroxide, oxygen and water to form a concentrated nitric acid.

Fig. 2 illustrates the use of the process of this invention in conjunction with the treatment of a liquid mixture of nitrosyl chloride and chlorine to separately recover therefrom as products of the process described liquid chlorine and a relatively concentrated nitric acid; and Fig. 3 illustrates a similar process for the production of chlorine and nitric acid from a mixture of nitrosyl chloride and chlorine embodying certain modifications in the process shown in Fig. 2.

In the drawings the numeral 1 indicates an absorption tower into the upper portion of which a relatively dilute aqueous nitric acid containing, for example, about 68% to 74% $HNO_3$ is introduced. A mixture of nitrogen peroxide and chlorine is introduced into the bottom of tower 1 and is passed upwardly through the tower in contact with the nitric acid descending therethrough at a temperature of, for example, about 30° C. There flows off from the bottom of the tower a relatively concentrated aqueous nitric acid solution containing some dissolved nitrogen peroxide and chlorine, particularly chlorine combined as nitrosyl chloride. The nitric acid may also contain chlorine in combination as hydrochloric acid. This acid solution is introduced into the top of tower 2 which operates as a desorber. Tower 2 is provided with a heater to heat the nitric acid descending through the tower to a temperature within the range of 50° to 100° C. Oxygen is also introduced into the bottom of the tower and passed upwardly in contact with the descending heated nitric acid. The gases evolved from the acid in the desober, together with oxygen introduced thereinto pass from the top of the desorber into the bottom of absorption tower 1 where they mingle with the nitrogen peroxide gas passed into this tower. These gases may contain nitrogen peroxide, chlorine, nitrosyl chloride and oxygen.

Instead of heating the nitric acid in desorber 2 and treating it at an elevated temperature with a relatively small amount of oxygen gas as described above, the acid from absorption tower 1 may be treated in desorber 2 by means of air or other gas inert towards nitric acid passed through the desorber in amount sufficient to remove from the acid at ordinary atmospheric temperatures nitrogen peroxide, nitrosyl chloride and chlorine contained therein. In thus treating the acid the gas leaving the desorber will contain relatively small proportions of nitrogen peroxide, nitrosyl chloride and chlorine which may be recovered, if desired, by absorption in water or the gas leaving the desorber may be discharged without further treatment.

The relatively dilute nitric acid introduced into absorption tower 1 is treated with the gases containing nitrogen peroxide and chlorine in such amount that the nitric acid solution after treatment in desorber 2 contains from 80% to 90% $HNO_3$. This relatively concentrated nitric acid is introduced into the mid-portion of a tower 3, the bottom of which is provided with a heater. In this tower the entering nitric acid is passed downwardly in contact with relatively dilute nitric acid vapors to evolve nitric acid and water vapors from the entering nitric acid and the mixture of nitric acid and steam vapors pass upwardly through the tower in contact with refluxed nitric acid, and thence to a condenser 4 where they are condensed to form nitric acid. A portion of this condensate is returned to the top of tower 3 as a nitric acid reflux. The amount of reflux is so regulated that upon condensing the nitric acid vapors leaving the top of the tower, a nitric acid of about 95% to 100% $HNO_3$ is formed. This relatively concentrated nitric acid, as noted above, is in part returned as reflux to the top of tower 3 and the remainder is withdrawn as a concentrated nitric acid product of this process. The relatively dilute nitric acid which passes downwardly into the bottom of tower 3 is heated to provide the nitric acid and water vapors for treatment of the more concentrated acid introduced into the mid-portion of this tower from desorber 2. Sufficient vapors are evolved from this nitric acid in the bottom of tower 3 so that it contains from 68% to 74% $HNO_3$, which is withdrawn from the bottom of the tower and is returned to the upper portion of absorption tower 1 for treatment with the gas containing nitrogen peroxide and chlorine.

The gases from the top of absorption tower 1 contain nitrogen peroxide and nitrosyl chloride together with some chlorine and oxygen. These gases are passed through a heat exchanger 5 and thence to an oxidation chamber 6, where nitrosyl chloride is oxidized to nitrogen peroxide and chlorine by means of the oxygen contained in the gas. The hot gaseous products of this oxidation treatment pass through heat exchanger 5 serving to preheat the incoming gas containing nitrosyl chloride and are then introduced into the nitrogen peroxide gas on its way to absorption tower 1. A portion of the gases from the top of absorption tower 1 are continuously withdrawn to a scrubber 7 where they are washed with water to absorb the nitrogen peroxide, nitrosyl chloride and chlorine, as well as any nitric acid which may be present in this withdrawn gas. The unabsorbed inert gases are vented from the top of scrubber 7 while the dilute aqueous solution from the bottom of scrubber 7 is introduced into the top of absorption tower 1.

In carrying out the process described above and illustrated in the drawings the proportions of water introduced into scrubber 7 and thence into absorption tower 1 and of nitrogen peroxide gas introduced into the bottom of absorption tower 1 are such as to form the desired relatively concentrated nitric acid of 80% to 90% $HNO_3$ leaving tower 1 and the 95% to 100% acid from tower 3. Since theoretically all of the chlorine gas present in the nitrogen peroxide gas introduced into the bottom of absorption tower 1 may be recovered as nitrosyl chloride, which may be oxidized to nitrogen peroxide and chlorine and reintroduced into absorption tower 1, once the desired proportion of chlorine has been introduced into the cyclic system in which the procedure described above is carried out, no further addition of chlorine is required except that necessary to make up for the chlorine losses from the system, for example, that lost with the inert gas withdrawn from scrubber 7 or the unavoidable losses of materials always encountered in the actual carrying out of chemical processes. The oxygen required for reaction of the nitrogen peroxide with the water is introduced into the bottom of desorber 2 and thence passes to absorption tower 1. In the continuous operation of the process described above the nitrogen peroxide and oxygen are introduced into the system in the proportions of about 4 mols of nitrogen peroxide for each 1 mol of oxygen, together with the required amount of make-up chlorine. As illustrative of the approximate composition of the gases in the process described above, it may be said that the gas leaving absorption tower 1 passing to heat exchanger 5 may contain about 0.5 mol of $NO_2$ to 1.5 mol $NOCl$ to 0.5 mol $Cl_2$ to 1 mol $O_2$. The gas after oxidation of nitrosyl in oxidation chamber 6 may contain 1.5 mols $NO_2$ to 0.5 mol $NOCl$ to 1 mol $Cl_2$ to 0.5 mol $O_2$. To this gas there is added about 2 mols of $NO_2$ for every 1.5 mols of $NO_2$ in the gas from the oxidation chamber 6, and about 0.5 mol oxygen are introduced into the bottom of desorber 2 for every 2 mols of $NO_2$ introduced into the gas leaving oxidation chamber 6. If desired, the distillation and rectification of nitric acid in tower 3 may be carried out under a reduced pressure below atmospheric. The acid from desorber 2 may also, if desired, be treated with concentrated sulfuric acid to obtain a more concentrated nitric acid (95% to 100% $HNO_3$) instead of being subjected to the distillation treatment described above.

Referring now to Fig. 2, the numeral 8 indicates a fractionating column in which a liquid mixture of nitrosyl chloride and chlorine which is introduced into the mid-portion of the column is fractionally distilled to yield a relatively pure chlorine condensate from the vapors leaving the top of the column and passed into a cooler 9. The liquid nitrosyl chloride descending through column 8 to the bottom of the column is vaporized by a heater 10 and a portion of the vapors passed upwardly in column 8 to distill from the descending liquid chlorine, the nitrosyl chloride itself being condensed and returned to the bottom of the column for vaporization.

Vapors of nitrosyl chloride are continuously withdrawn from the bottom portion of column 8, are mixed with oxygen gas sufficient for the oxidation of nitrosyl chloride to chlorine and nitrogen peroxide, and are passed through a heat exchanger 11 and thence to an oxidation chamber 12. The hot products of reaction from oxidation chamber 12 pass through heat exchanger 11 in heat exchange relationship with the incoming nitrosyl chloride gas and serve to preheat this gas to a temperature at which the reaction of the oxygen and nitrosyl chloride is initiated. This reaction is exothermic so that in passing through oxidation chamber 12 the temperature of the reacting gases rises as the reaction progresses. The temperature of the reacting gases, however, should not be permitted to rise above about 400° C. The reaction products from heat exchanger 11 are passed in series first through a cooler 13 and thence through a cooler 14. In cooler 13 the reaction gases are cooled to a temperature sufficiently low to condense the nitrogen peroxide as a liquid. This liquid nitrogen peroxide may contain some chlorine and some nitrosyl chloride which was unoxidized in the passage of the gases through oxidation chamber 12. In cooler 14 the gases from cooler 13 are further cooled to condense out a desired proportion of the chlorine. This liquid chlorine, which may also contain some nitrosyl chloride and nitrogen peroxide, is introduced into the mid-portion of column 8 for the separation of the chlorine from the nitrosyl chloride and nitrogen peroxide, the nitrogen peroxide becoming mixed with the vapors of nitrosyl chloride withdrawn from the bottom of column 8.

The cooling of the gases in cooler 14 is carried to such a degree that the chlorine content of the gases leaving this cooler, together with the chlorine in the liquid nitrogen peroxide removed from cooler 13, amounts to about 0.5 mol of chlorine for every 3 mols of $NO_2$ in the liquid and gas containing this chlorine. This liquid and gas are both introduced into the bottom portion of an absorption tower 15 containing bubbling plates or a packing for promoting intimate contact between an aqueous nitric acid introduced into the top of the tower and passed downwardly in contact with the ascending gases comprising chlorine and nitrogen peroxide. If desired, the liquid nitrogen peroxide in cooler 13 may be vaporized before being introduced into tower 15 or, if the nitrogen peroxide is passed directly as a liquid into this tower, it will become vaporized by the absorption of heat from the acid with which it is contacted in the tower. The nitrogen peroxide and chlorine react with the nitric acid in tower 15 in the manner described above in connection with the operation of absorption tower 1 of Fig. 1 of the drawings, and the resulting relatively concentrated nitric acid is withdrawn from the bottom of tower 15 and introduced into the top of a desorber 16 where it is heated and treated with oxygen gas as described above in connection with the operation of desorber 2 of Fig. 1. The concentrated nitric acid is withdrawn from the bottom of desorber 16. The gas containing nitrosyl chloride, oxygen and some chlorine from the top of absorber 15 is introduced into the nitrosyl chloride gas passing from rectification column 8 to heat exchanger 11. The oxygen required for oxidation of the nitrosyl chloride in oxidation chamber 12 is introduced into the bottom of desorber 16.

It may be noted that in carrying out the process of Fig. 2 as described, the chlorine content of the nitrosyl chloride withdrawn from the bottom of rectification column 8 is all removed as liquid chlorine from cooler 14 and recovered as a relatively pure liquid chlorine from cooler 9. There is maintained, however, in the gas cyclic system comprising absorption tower 15 a sufficient amount of chlorine to promote the reaction of the nitrogen peroxide with the aqueous nitric acid in the manner described. It is preferred to fractionally distill the nitrosyl chloride and chlorine mixture in fractionating column 8, to oxidize the nitrosyl chloride and to condense the nitrogen peroxide and chlorine in coolers 13 and 14 all under a pressure in excess of atmospheric as, for example, a pressure of about 8 atmospheres. If desired, both absorption tower 15 and desorber 16 may also be operated under a pressure in excess of atmospheric, although it is preferred to employ substantially atmospheric pressure in desorber 16 even though a higher pressure be maintained in absorption tower 15.

With reference to the process illustrated in Fig. 3, a gaseous mixture of nitrosyl chloride and chlorine may be compressed in the compressor 17 to, for example, 5 atmospheres and passed into a cooling coil 18 where it is cooled to a temperature of, for example, 10° C. to liquefy both the nitrosyl chloride and the chlorine. The uncondensed inert gases pass out of the top of cooling coil 18 while the liquid nitrosyl chloride and chlorine may be introduced by means of a pump 19 into the mid-portion of the rectification column 20. In column 20 the liquid mixture of nitrosyl chloride and chlorine is fractionally distilled to separate the chlorine and nitrosyl chloride in the manner described above in connection with the operation of column 8 of Fig. 2, except that the amount of nitrosyl chloride vaporized in the bottom of column 20 is limited to that sufficient for the distillation from the liquid mixture of the chlorine and the remaining nitrosyl chloride is withdrawn as a liquid from the bottom of column 20 and is passed to a heater 21 to vaporize the liquid. The vaporized nitrosyl chloride is mixed with sufficient oxygen for its oxidation to form nitrogen peroxide and chlorine and is then heated and passed through an oxidation chamber 22 at a temperature of about 250° C. in contact with a catalyst promoting the oxidation of nitrosyl chloride.

The gas leaving oxidation chamber 22 is cooled to a temperature at which nitric oxide reacts preferentially with the free oxygen contained in the gas instead of the free chlorine therein, for example a temperature of about 100° C. or below, and at this temperature is mixed with sufficient nitric oxide to react with the oxygen in the gas to form nitrogen peroxide. The gases may be passed through an oxidation chamber 23 to give sufficient time for the reaction of the nitric oxide with the oxygen and, if desired, this oxidation chamber may contain a catalyst promoting the reaction. The gas now containing nitrogen peroxide, chlorine and some residual nitrosyl chloride not oxidized in oxidation chamber 22 is passed into the bottom of an absorption tower 24 where it is passed in countercurrent flow with aqueous nitric acid containing, for example, about 75% $HNO_3$ which is introduced into the top of the tower. The nitrogen peroxide is absorbed in the nitric acid and reacts with the water in the presence of chlorine to form a more concentrated nitric acid which is withdrawn from the bottom of absorption tower 24 and passed into the top of a desorber 25. The residual unabsorbed gases leaving the top of tower 24 containing nitrosyl chloride and chlorine may be returned to and mixed with the nitrosyl chloride-chlorine containing gas passing through compressor 17 to cooling coil 18 whereby the nitrosyl chloride and chlorine content of the gases from tower 24 may be treated in the manner described above, together with this fresh nitrosyl chloride-chlorine gas.

In desorber 25 the nitric acid is heated to a temperature of, for example, 50° to 100° C. or higher to strip it of chlorine and any adsorbed nitrogen oxides, and a portion of the thus treated nitric acid is returned to the top of absorption tower 24 after being diluted with the requisite amount of water to form a solution containing about 75% HNO₃. The remaining portion of the concentrated nitric acid from desorber 25 may be withdrawn as a product of this process.

Since numerous changes may be made in the particular process described above without departing from the scope of the invention, the example given is to be understood as illustrative of the invention rather than limiting it.

In my copending application Serial No. 225,872, filed August 20, 1938, as a continuation-in-part of this application, I am claiming the process for reacting nitrogen peroxide and chlorine to form a nitric acid containing at least 70 parts HNO₃ to 30 parts H₂O disclosed herein.

I claim:

1. In a process for the treatment of nitrosyl chloride to obtain nitric acid and chlorine from the nitrogen and chlorine combined therein, that improvement which comprises introducing said nitrosyl chloride into a circulatory system and in said system oxidizing the nitrosyl chloride to nitrogen peroxide and chlorine, reacting the resulting nitrogen peroxide with an aqueous liquid and chlorine at a temperature at which the nitrogen peroxide is absorbed by said aqueous liquid and reacts with water contained therein to form nitric acid and nitric oxide and the nitric oxide reacts with the chlorine to form nitrosyl chloride, separating from the nitric acid the nitrosyl chloride formed by reaction of the chlorine and nitric oxide, recycling the thus separated nitrosyl chloride in the aforesaid circulatory system together with fresh nitrosyl chloride introduced thereinto and withdrawing from said system excess chlorine liberated by the aforesaid oxidation of nitrosyl chloride.

2. In a process for the treatment of nitrosyl chloride to obtain nitric acid and chlorine from the nitrogen and chlorine combined therein, that improvement which comprises introducing said nitrosyl chloride into a circulatory system and in said system oxidizing the nitrosyl chloride to nitrogen peroxide and chlorine, treating the resulting mixture of nitrogen peroxide and chlorine with an aqueous liquid at a temperature at which the nitrogen peroxide is absorbed by said aqueous liquid and reacts with water contained therein to form nitric acid and nitric oxide and the nitric oxide reacts with a part of said chlorine to form nitrosyl chloride, treating said mixture of nitrogen peroxide and chlorine with the aqueous liquid in proportions such that gaseous nitrosyl chloride is evolved from the nitric acid formed by reaction of said aqueous liquid and nitrogen peroxide, separating from the nitric acid the nitrosyl chloride formed by reaction of said chlorine and nitric oxide, recycling the thus separated nitrosyl chloride in the aforesaid circulatory system together with fresh nitrosyl chloride introduced thereinto and withdrawing from said system excess chlorine liberated by the aforesaid oxidation of nitrosyl chloride.

3. In a process for the treatment of a mixture of nitrosyl chloride and chlorine to obtain nitric acid from the nitrogen combined as nitrosyl chloride and separately recover the chlorine, that improvement which comprises introducing said nitrosyl chloride and chlorine into a circulatory system and in said system liquefying said nitrosyl chloride and chlorine, fractionally distilling the resulting liquid mixture to separate chlorine from the nitrosyl chloride, withdrawing the chlorine from said circulatory system, oxidizing the nitrosyl chloride to form a mixture of nitrogen peroxide and chlorine, passing said mixture of nitrogen peroxide and chlorine in contact with an aqueous liquor at a temperature at which nitrogen peroxide is absorbed by said aqueous liquid and reacts with water contained therein to form nitric acid and nitric oxide and the nitric oxide reacts with a part of the chlorine to form nitrosyl chloride, contacting said aqueous liquid, nitrogen peroxide and chlorine in proportions such that gaseous nitrosyl chloride is evolved from the nitric acid formed by reaction of the aqueous liquid and nitrogen peroxide, and recycling the resulting mixture of nitrosyl chloride and unreacted chlorine in said circulatory system together with fresh nitrosyl chloride-chlorine gas introduced thereinto.

4. In a process for the treatment of a mixture of nitrosyl chloride and chlorine to obtain nitric acid from the nitrogen combined as nitrosyl chloride and separately recover the chlorine, that improvement which comprises introducing said nitrosyl chloride and chlorine into a circulatory system and in said system liquefying said nitrosyl chloride and chlorine, fractionally distilling the resulting liquid mixture to separate chlorine from the nitrosyl chloride, withdrawing the chlorine from said circulatory system, mixing the nitrosyl chloride with oxygen and heating the mixture to oxidize the nitrosyl chloride to nitrogen peroxide and chlorine, introducing into the reaction product thus obtained at a temperature of about 100° C. nitric oxide in amount sufficient to react with residual free oxygen in said reaction product to form nitrogen peroxide, passing the gas containing nitrogen peroxide and chlorine thus obtained in contact with an aqueous liquor at a temperature at which nitrogen peroxide is absorbed by said aqueous liquid and reacts with water contained therein to form nitric acid and nitric oxide and the nitric oxide reacts with a part of the chlorine to form nitrosyl chloride, contacting said aqueous liquid, nitrogen peroxide and chlorine in proportions such that gaseous nitrosyl chloride is evolved from the nitric acid formed by reaction of the aqueous liquid and nitrogen peroxide, and recycling the resulting mixture of nitrosyl chloride and unreacted chlorine in said circulatory system together with fresh nitrosyl chloride-chlorine gas introduced thereinto.

5. The process for the treatment of a gaseous mixture of nitrosyl chloride and chlorine which comprises cooling said mixture to condense a liquid mixture of nitrosyl chloride and chlorine, fractionally distilling said liquid mixture to separate chlorine from the nitrosyl chloride, mixing the nitrosyl chloride with oxygen and heating the mixture to oxidize the nitrosyl chloride to nitrogen peroxide and chlorine, introducing into the the reaction product thus obtained at a temperature of about 100° C. nitric oxide in amount sufficient to react with residual free oxygen in said reaction product to form nitrogen peroxide, passing the gas containing nitrogen peroxide and chlorine thus obtained in contact with an aqueous liquor and reacting the nitrogen peroxide and a part of the chlorine with the aqueous liquor with the formation of nitric acid and nitrosyl chloride, introducing nitrosyl chloride thus formed and mixed with unreacted chlorine into the aforesaid gaseous mixture of nitrosyl chloride and chlorine and treating the mixture thus obtained in the manner described to separately recover chlorine and nitrosyl chloride therefrom, to oxidize the nitrosyl chloride and to react the nitrogen peroxide thus obtained with an aqueous liquid.

6. In a process for the treatment of nitrosyl chloride to obtain nitric acid and chlorine from the nitrogen and chlorine combined as nitrosyl chloride, that improvement which comprises introducing said nitrosyl chloride into a circulatory system and in said system heating the nitrosyl chloride with oxygen to oxidize it and to form a gas containing nitrogen peroxide, chlorine and free oxygen, introducing nitric oxide into said gas at a temperature at which the nitric oxide reacts preferentially with the free oxygen instead of with the free chlorine in said gas, treating the resulting mixture of nitrogen peroxide and chlorine with an aqueous liquid in the presence of chlorine at ordinary atmospheric temperatures at which temperatures nitrogen peroxide is absorbed by said aqueous liquid and reacts with water contained therein to form nitric acid and nitric oxide and the nitric oxide reacts with said chlorine to form nitrosyl chloride, employing said aqueous liquid, nitrogen peroxide and chlorine in proportions such that gaseous nitrosyl chloride is evolved from the nitric acid formed by reaction of said aqueous liquid and nitrogen peroxide, recycling the nitrosyl chloride formed by the reaction of the nitrogen peroxide, chlorine and aqueous liquid in the aforesaid circulatory system together with fresh nitrosyl chloride introduced thereinto and withdrawing from said system excess chlorine liberated by the aforesaid oxidation of nitrosyl chloride.

7. The process for the treatment of a liquid mixture of nitrosyl chloride and chlorine which comprises fractionally distilling said liquid to recover the chlorine separate from the nitrosyl chloride, oxidizing the thus separated nitrosyl chloride, cooling the gaseous mixture containing nitrogen peroxide and chlorine thus obtained to liquefy nitrogen peroxide and leave chlorine as a gas, cooling the gas containing chlorine to liquefy chlorine therefrom, introducing the liquefied chlorine into the aforesaid mixture of nitrosyl chloride and chlorine being fractionally distilled, reacting the aforesaid liquefied nitrogen peroxide with aqueous nitric acid in the presence of chlorine with the formation of nitric acid and nitrosyl chloride, and mixing the nitrosyl chloride thus formed with the aforementioned nitrosyl chloride separated from chlorine prior to the described oxidation of the nitrosyl chloride.

8. The process for the treatment of a liquid mixture of nitrosyl chloride and chlorine which comprises fractionally distilling said liquid to recover the chlorine separated from the nitrosyl chloride, oxidizing the thus separated nitrosyl chloride, cooling the gaseous mixture containing nitrogen peroxide and chlorine thus obtained to liquefy nitrogen peroxide and leave chlorine as a gas, cooling the gas containing chlorine to liquefy chlorine therefrom, introducing the liquefied chlorine into the aforesaid mixture of nitrosyl chloride and chlorine being fractionally distilled, reacting the aforesaid liquefied nitrogen peroxide with aqueous nitric acid in the presence of chlorine with the formation of nitric acid and nitrosyl chloride, oxidizing nitrosyl chloride thus formed to nitrogen peroxide and chlorine, and treating the oxidation products thus obtained together with the aforementioned gaseous mixture containing nitrogen peroxide and chlorine for condensation of liquid nitrogen peroxide and of chlorine in the manner described.

9. The process for the production of nitric acid which comprises reacting nitrogen peroxide with an aqueous liquid in the presence of chlorine with the formation of nitric acid and nitrosyl chloride, oxidizing the nitrosyl chloride by means of oxygen, to form nitrogen peroxide and chlorine and reacting the products of said oxidation together with additional nitrogen peroxide with an aqueous liquid to form nitric acid.

10. The process for the production of nitric acid which comprises passing an aqueous liquid in contact with a flow of gas containing nitrogen peroxide and chlorine and reacting nitrogen peroxide and chlorine in said gas with the aqueous liquid with the formation of nitric acid and nitrosyl chloride, heating the nitric acid thus formed to free it of nitrogen oxides and chlorine, introducing the thus liberated nitrogen oxides and chlorine (free and combined) into the aforesaid gas containing nitrogen peroxide passed in contact with the aqueous liquid, oxidizing nitrosyl chloride contained in the gases leaving contact with said aqueous liquid to nitrogen peroxide and chlorine by heating the gases with oxygen and introducing the products of said oxidation into the aforesaid nitrogen peroxide gas passed in contact with the aqueous liquid.

11. The process for the production of nitric acid from nitrosyl chloride and nitric oxide which comprises oxidizing said nitrosyl chloride by means of oxygen to form a gas mixture containing nitrogen peroxide, chlorine and unreacted oxygen, thereafter introducing nitric oxide into said gas mixture and preferentially reacting said nitric oxide to produce nitrogen peroxide with the free oxygen instead of with the free chlorine in said gas mixture, reacting the nitrogen peroxide in the resulting gas with an aqueous liquid and chlorine contained in the gas at a temperature at which the nitrogen peroxide is absorbed by said aqueous liquid and reacts with water contained therein to form nitric acid and nitric oxide and this nitric oxide reacts with the chlorine to form nitrosyl chloride.

12. The process for the production of nitric acid and chlorine from nitrosyl chloride and nitric oxide which comprises introducing said nitrosyl chloride into a circulatory system and in said system oxidizing the nitrosyl chloride by means of oxygen to form a gas mixture containing nitrogen peroxide, chlorine and unreacted oxygen, introducing nitric oxide into said gas mixture at a temperature at which the nitric oxide reacts preferentially with the free oxygen instead of with the free chlorine therein, reacting the nitrogen peroxide in the resulting gas with an aqueous liquid and a portion only of said chlorine at a temperature at which the nitrogen peroxide is absorbed by said aqueous liquid and reacts with water contained therein to form nitric acid and nitric oxide and this nitric oxide reacts with the chlorine to form nitrosyl chloride, separating the remaining unreacted chlorine and the nitrosyl chloride formed by reaction of chlorine and nitric oxide from the nitric acid, recycling the thus separated nitrosyl chloride in the aforesaid circulatory system together with fresh nitrosyl chloride introduced thereinto and withdrawing from said system excess chlorine liberated by the aforesaid oxidation of nitrosyl chloride.

HERMAN A. BEEKHUIS, Jr.